United States Patent [19]

Selzer

[11] Patent Number: 4,901,594
[45] Date of Patent: Feb. 20, 1990

[54] GAS SPRING ASSEMBLY FOR A PASSENGER SEAT CONTROL

[76] Inventor: Günther Selzer, Gartenstrasse 9, 5603 Wuelfrath, Fed. Rep. of Germany

[21] Appl. No.: 354,496

[22] Filed: May 19, 1989

Related U.S. Application Data

[62] Division of Ser. No. 157,893, Feb. 19, 1988, Pat. No. 4,856,762.

[51] Int. Cl.⁴ .............................................. F16C 1/10
[52] U.S. Cl. .................... 74/501.5 H; 74/502.4; 74/502.6; 74/500.5; 74/501.5 R
[58] Field of Search ........ 74/500.5, 501.5 R, 501.5 H, 74/501.6, 502.4, 502.6, 502, 503; 267/64.12, 131; 188/2 D; 244/129.2

[56] References Cited

U.S. PATENT DOCUMENTS

| 2,001,415 | 5/1935 | Freeman | 74/501.5 H |
| 2,323,352 | 7/1943 | Pitts | 74/501.5 H |
| 2,365,247 | 12/1944 | Carlton | 74/501.5 H |
| 2,424,198 | 7/1947 | Tauscher | 74/501.5 R |
| 3,757,612 | 9/1973 | Schaefer | 74/500.5 X |
| 3,885,770 | 5/1975 | Houk | 74/500.5 X |
| 4,281,252 | 7/1981 | Parsons et al. | 74/500.5 X |
| 4,584,898 | 4/1986 | Panushka | 74/502 X |
| 4,724,675 | 2/1988 | Douillet | 74/500.5 |
| 4,823,915 | 4/1983 | Nagano | 188/2 D |

FOREIGN PATENT DOCUMENTS

| 0249213 | 10/1987 | Japan | 74/500.5 |
| 307515 | 8/1955 | Switzerland | 74/500.5 |

Primary Examiner—Vinh T. Luong
Attorney, Agent, or Firm—Fulwider, Patton, Lee & Utecht

[57] ABSTRACT

A gas spring mechanism for adjusting and locking the inclination of one element with respect to another, such as the backrest on a passenger seat. The gas spring has a low melting point plug which melts in the event of a fire to discharge compressed gas in the gas spring and thereby allow for the expansion of working liquid in the gas spring. In one preferred embodiment, the compressed gas contains a fire retardant such as Halon 1301.

6 Claims, 2 Drawing Sheets

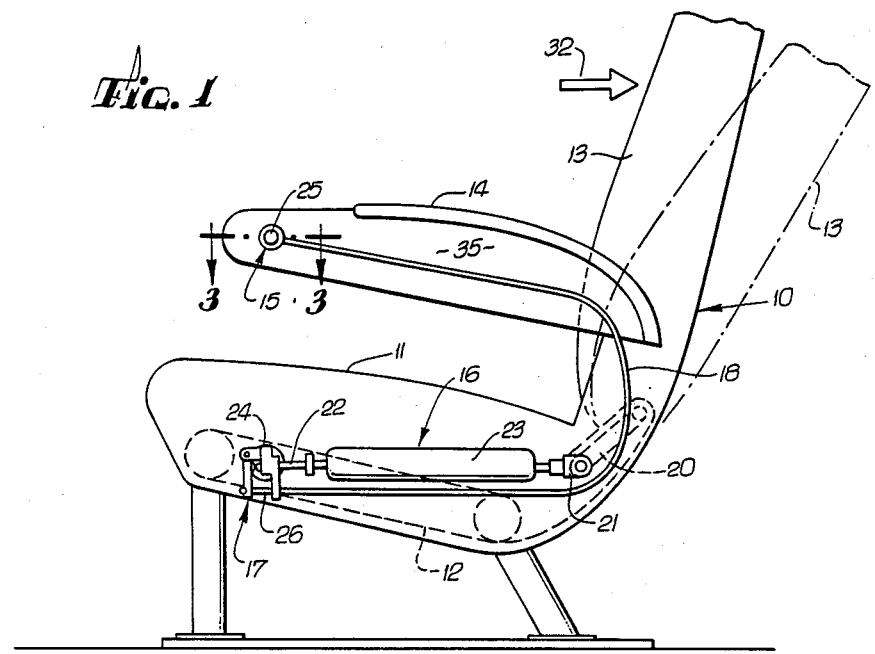
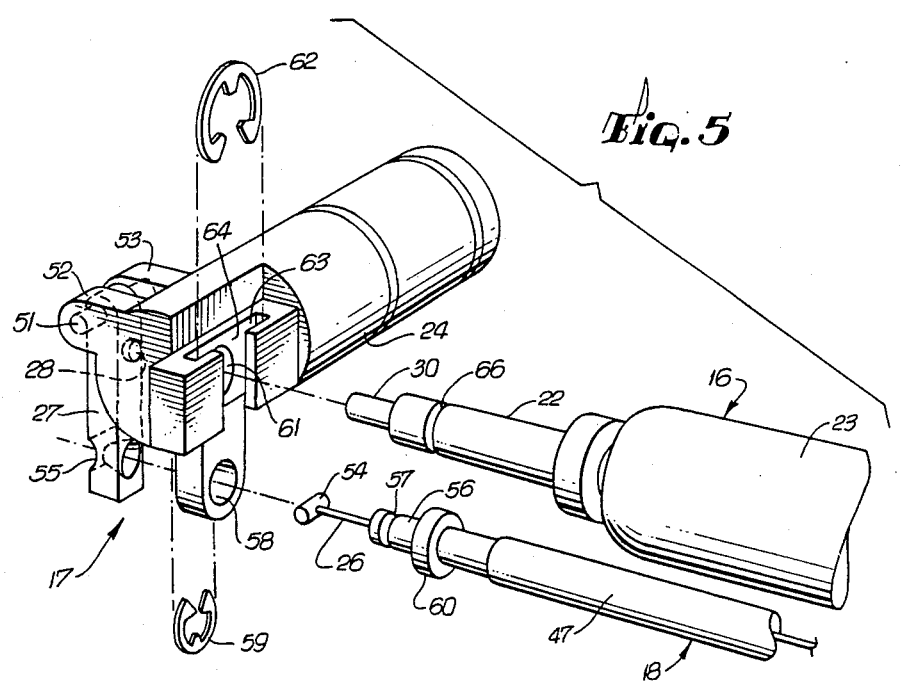

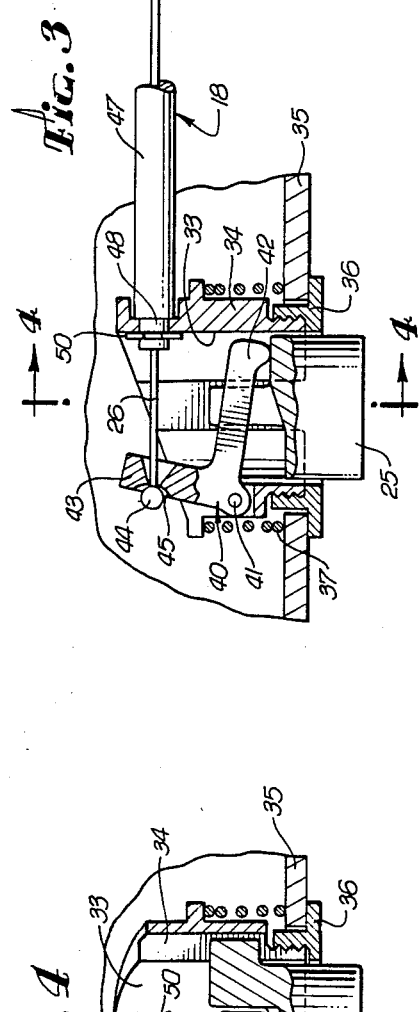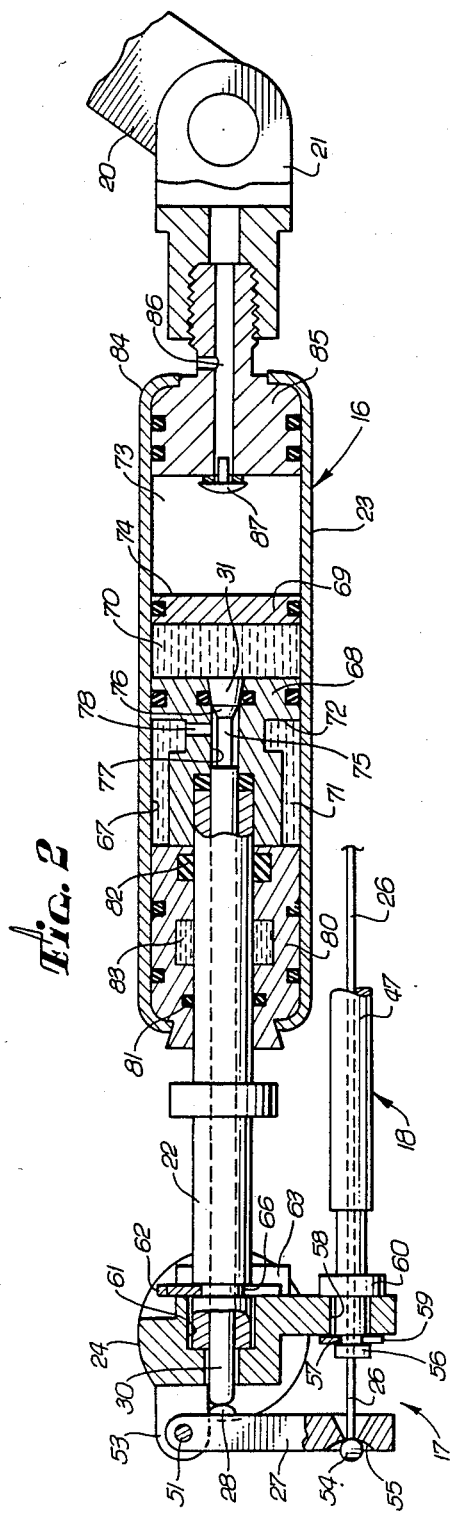

GAS SPRING ASSEMBLY FOR A PASSENGER SEAT CONTROL

This is a division of application Ser. No. 157,893, filed Feb. 19, 1988, now U.S. Pat. No. 4,856,762, issued on Aug. 15, 1989.

BACKGROUND OF THE INVENTION

This invention generally relates to an apparatus for adjusting and locking the angular position of one member with respect to another which is especially applicable to the adjustment in inclination of the backrest of a seat, for example, an aircraft or railway seat, and the locking thereof by means of a piston cylinder unit. The piston cylinder unit is actuated by an operating cable controlled by push button mounted in the armrest of the seat.

Existing adjustable backrests for seats used in aircraft usually incorporate an hydraulic piston cylinder unit in conjunction with mechanical springs for adjusting the inclination of the backrest and the locking thereof in a desired position. The springs are provided to restore the backrest to its starting position when it is unloaded. The push button is mounted on the armrest and, when activated, releases the piston cylinder unit and the piston rod therein is displaced by the force of the springs acting on the unit. When the push button is released, the piston cylinder unit locks any further movement of the backrest. In this manner a seat back can be adjusted and locked as desired within a predetermined angular range.

The hydraulic piston cylinder unit together with the spring system is complicated and time consuming to install. However, these hydraulic piston cylinder units have been used almost exclusively in aircraft seating. One of the important advantages of these prior units was that little force was necessary to operate the push button and this allowed children and the physically impaired to actuate the device.

It is recently been found that in fires, the hydraulic piston cylinder unit tends to leak hydraulic fluid which is inflammable and which can add to the severity of the fire.

What has been needed and heretofore unavailable is a relatively simple piston cylinder unit which is easy to install and which will not leak hydraulic fluid at elevated temperatures. The present invention satisfies this need.

SUMMARY OF THE INVENTION

This invention relates to an apparatus for adjusting the angle of one member with respect to another such as the back of a passenger seat which is pivotally mounted to the horizontal seat portion and to an improved gas spring which is particularly suitable for such use.

The apparatus in accordance with the invention generally includes a remote push button actuating unit which is positioned within an armrest of a passenger seat. A gas spring is connected at one end thereof to the pivotally mounted back portion of the seat and the free end of a piston rod extending out of the other end of the gas spring is connected to the frame of the horizontal seat portion. A lever actuated assembly, which is fixed to the frame of the seat moves an actuating member provided on the free end of the piston rod extending out of the gas spring unit. The remote actuating unit is operatively connected to the lever actuating assembly by means of an operating cable, such as a Bowden cable.

The gas spring is provided with an elongated housing having first and second pistons slidably disposed within an elongated working chamber therein and separating the working chamber into three subchambers, an intermediate chamber between the first and second pistons, a first end chamber adjacent the side of the first piston opposite the side adjacent the intermediate chamber and a second end chamber adjacent the side of the second piston opposite the side adjacent the intermediate chamber. The first end chamber and the intermediate chamber are filled with incompressible liquid, such as hydraulic fluid, whereas the second end chamber is filled with a compressed, non-combustible gas such as nitrogen, helium, argon, neon, or mixtures thereof. A valve means is provided to control the flow of incompressible liquid between the intermediate chamber and the first end chamber to facilitate the movement of the first piston therein. The piston rod is secured at one end to the first piston so that movement of the piston effects movement of the piston rod connected thereto and as a result the inclination of the backrest.

In accordance with a preferred embodiment, a conduit is provided between the second end chamber and the exterior of the gas spring which has a low melting point plug. This plug at ambient temperatures prevents the escape of compressed gas once the second end chamber is charged, but in the event of elevated temperatures, such as found in a fire, the plug will melt unblocking the conduit and thereby permitting compressed gas within the second end chamber to escape to the atmosphere. This escape relieves pressure within the working chamber of the gas spring giving more space within the working chamber for hydraulic fluid to expand without pressure build up and thereby preventing the escape of inflammable hydraulic fluid.

In a presently preferred embodiment, the compressed gas has incorporated therein a flame retardant such as brominated and fluorinated low molecular weight hydrocarbons. The most effective is bromotrifluoromethane which is sold under the trademark Halon 1301 by the DuPont Company. The brominated, fluorinated hydrocarbons interfere with the combustion process and the interfering reaction thereof is sufficiently rapid to prevent combustion and flame propagation even at concentrations as low as 2% by volume. The brominated, fluorinated compounds are relatively non-toxic to humans so that in the event of a fire, the escaping gas containing the flame retardant will provide a measure of protection to a passenger sitting in the seat yet the passenger is able to breath the gas with no detrimental effects.

In another preferred embodiment, the hydraulic fluid in the first end chamber is replaced with a working fluid containing the brominated, fluorinated hydrocarbons. However, these components are gases at ambient conditions, and they must be maintained under substantial pressure (e.g., 15-30 bars) in order to stay in the liquid phase. Preferably, substantially all of the working fluid is a brominated, fluorinated hydrocarbon, such as bromotrifluoromethane and dibromodifluoromethane or mixtures thereof. For optimum safety, all three of the separate chambers should contain the brominated, fluorinated hydrocarbons.

Additionally, an improved method of mounting the control assembly of the gas spring to the frame of the seat is provided. A mounting member fixed to the frame is provided with an opening adapted to receive the free end of the piston rod. A slotted receptacle is provided in the mounting member which is oriented perpendicularly to the axis of the opening and which is adapted to receive a spring clip. The piston rod is provided with a circumferential groove, and a spring clip is urged into the slotted receptacle to be mounted about the circumferential groove in the free end of the piston rod in order to fix the free end of the piston rod to the mounting member secured to the seat frame. Stopping elements may be provided on the piston rod to control the maximum movement of the piston within the cylindrical housing of the gas spring.

The apparatus of the present invention provides an additional measure of safety and moreover it can be easily installed and dismantled with simple tools by personnel with very little mechanical skills. These and other advantages of the invention will become more apparent from the following detailed description thereof when taken in conjunction with the accompanying exemplary drawings.

BRIEF DESCRIPTION OF THE DRAWINGS

FIG. 1 is a side view with parts exposed of a passenger seat embodying features of the invention;

FIG. 2 is a cross-sectional view of a gas spring and lever actuating assembly shown in FIG. 1;

FIG. 3 is a cross-sectional view of a remote actuating unit taken along the lines of 3—3 shown in FIG. 1; along FIG. 4 is a cross-sectional view taken the lines of 4—4 of the remote actuating unit shown in FIG. 3; and FIG. 5 is a perspective view of the connection between the operating cable, a lever actuating assembly, and the gas spring shown in FIG. 1.

DETAILED DESCRIPTION OF THE INVENTION

Reference is made to FIG. 1 which illustrates a passenger seat 10 embodying features of the invention. The seat 10 comprises a horizontal portion 11 supported by an underlying frame 12 shown partially in phantom and a back portion 13 which is pivotally connected to underlying frame 12. Armrests 14 are provided on each side of the backrest 13.

The system for adjusting and locking the position or inclination of the back portion 13 generally comprises a remote actuating unit 15 positioned within the armrest 14, a gas spring 16, and a lever actuating assembly 17 located in the horizontal seat portion 11, and an operating cable assembly 18 connected between the remote actuating unit 15 and the lever actuating assembly 17.

The gas spring 16 is secured on one end thereof to the extension element 20 on the pivotally mounted back portion 18 by means of a forked head fixture 21. A piston rod 22 extends out of the other end of the gas spring 16 and the end extending out of the housing 23 is releasably connected to the mounting member 24 of the lever actuating assembly 17.

Inward movement of the push button 25 of the remote actuating unit 15 pulls cable element 26 in the operating cable 18 which in turn causes the lever 27 on the lever actuating assembly 17 to be pulled toward the end of the piston rod 22 so the button 28 engages the valve release rod 30 slidably mounted within the piston rod 22. Inward pressure on the release rod 30 releases a valve body 31 (shown in FIG. 2) within the gas spring 16 which allows movement of the piston rod 22 inwardly and outwardly of the gas spring housing 23. If a force is applied to the backrest 13, as indicated by arrow 32, with the valve body 31 in the release position, the gas spring housing 23 will be urged toward the lever actuating assembly 17 thereby allowing the backrest 13 to move into an inclined position shown in phantom in FIG. 1. If there is no force applied to the backrest 13, the pressure within the gas spring 16 will urge the gas spring housing 23 away from the lever actuating assembly 17 and result in the backrest 13 moving to an upright position. Removing the pressure from the push button 25 in the remote actuating unit 15 disengages the valve release rod 30 to lock the gas spring 16 and thus locks the backrest 13 in its position at the time of the disengagement.

The remote actuating unit 15, shown in detail in FIGS. 3 and 4, generally comprises a push button 25 which is slidably mounted within a cylindrical bore 33 of housing 34 secured to side panel 35 of the armrest 14 by means of a threaded or bayonet type collar 36. A compressed spring 37 is provided to apply tension between the housing 34 and the connected collar 36 to maintain the proper position thereof within the side panel 35. A two-arm crank 40 is pivotally mounted by pin 41 in the housing 34. One arm 42 of the crank 40 is urged against the back side of the push button 25 and the other arm 43 is adapted to releasably receive an end of the cable element 26 in operating cable 18. The cable element 26 has a small cylindrical body 44 on the end thereof adapted to be seated within a concave recess 45 provided in the far side of crank arm 43. The arm 43 has a slot (not shown) in the side thereof to the recess 45 so that the cable element 26 can be inserted therethrough to place the cylindrical body 44 within the concave recess 45. The end of covering 47 of the operating Bowden cable 18 is provided within fitting 48 which passes through an opening in the housing 34 and a circumferential groove (not shown) is provided in the periphery of the fitting in order to receive a spring clip 50 which secures the end of the operating cable 18 in proper position within the housing 34 and prevents the removal therefrom.

The lever actuating assembly 17, best shown in FIGS. 2 and 5, generally comprises a mounting member 24 which is secured to the frame 12 (shown partially in phantom) supporting the horizontal seat portion 11. Lever arm 27 is pivotally mounted about pin 51 at one end thereof to ears 52 and 53 of the mounting member 24. The free end of lever arm 27 is adapted to receive the end of the cable element 26 in a manner similar to the cable connection in remote actuating unit 15. A cylindrical body 54 is provided on the end of the cable element 26 which is adapted to be seated within the concave recess 55 provided in the opposite face of the lever arm 27. A slotted opening (not shown) is provided in the side of the free end of lever arm 27 to the recess 55 to allow the cable element 26 to be inserted in order to place the cylindrical body 54 into the concave recess 55. A fitting 56 within a groove 57 in the periphery thereof passes through opening 58 and a spring clip 59 engages the groove 57 to hold the fitting. A threaded collar 60 is provided to be tightened against the mounting member 24 in the side opposite the spring clip 59 to fix the end of the cable 18 to the mounting member 24 and to adjust the length of the cable so that button 28 has direct contact with release rod 30.

The free end of piston rod 22 which extends out of the gas spring housing 23 is seated within opening 61 provided in mounting member 24 and a spring clip 62 is inserted through the slotted opening 63 of the receiving receptacle 64, as shown best in FIG. 5, and engages a groove 66 in the periphery of the piston rod 22 to thereby fix the free end within the receptacle 64. A valve release rod 30 slidably mounted in an axial bore within the piston rod 22 extends out of the free end of the piston rod 22 and is engaged by pressing element or button 28 on the inside of the lever arm 27 when the lever arm is pulled by cable element 26. This pushes the valve release rod 30 into piston rod 22 to activate a valve body 31 within the gas spring housing 23, shown in FIG. 2.

The details of the gas spring 16 embodying features of the invention are best illustrated in FIG. 2. As shown therein, the gas spring 16 generally comprises a cylindrical housing or outer shell 23 and an inner working chamber 67 disposed therein. A first piston 68 and a second piston 69 are slidably and sealingly mounted within the working chamber 67 and divide the working chamber into three separate chambers, an intermediate chamber 70 between the first and second piston 68 and 69, a first end chamber 71 disposed on the side 72 of the first piston 68 opposite the intermediate chamber 70, and a second end chamber 73 disposed on the side 74 of the second piston 69 opposite the intermediate chamber 70. The inner end 75 of valve release rod 30 is slidably disposed within the axial bore of piston rod 22 and engages the tapered end 76 of the valve body 31 so that when the valve releasing rod 30 is pushed inwardly toward the valve body 31, it is lifted out of the valve seat provided, allowing hydraulic fluid within the working chamber 67 to pass through a central opening 77 in the valve seat and conduit 78 in the first piston 68 and to thereby flow between the intermediate chamber 70 and the first end chamber 71. Lifting the valve body 31 and allowing hydraulic fluid to flow therethrough forces the first piston 68 to move within the working chamber 67, and, as a result, the piston rod 22 attached thereto. Release of the valve release rod 30 resets valve body 31 into the valve seat to thereby lock the position of the first piston and the attached piston rod.

The second end chamber 73 is charged with compresed gas urging the second piston 69 toward the first piston 68 thereby maintaining the hydraulic fluid contained in the intermedite chamber 70 under pressure. The pressure of the compressed gas acting against the second piston 69 is chosen so that when the push button 25 of the remote actuating unit 15 is pushed, thereby lifting the valve body 31 from the valve seat and if no force is applied to the backrest 13 in the direction of the arrow 32 shown in FIG. 1, enough force will be generated on the piston rod 22 to pivot the backrest 13 to its upright position, shown in FIG. 1.

A guiding element 80 is provided within the gas spring housing 23 to engage the exterior of the piston rod 22 and guide the axial movement thereof within the housing. O-ring gaskets 81 and 82 are provided to prevent the escape of hydraulic fluid therethrough and a grease chamber 83 is positioned about the periphery of rod 22 to provide lubrication.

In accordance with a very important aspect of the invention, the opposite end 84 of the housing 23 is provided with a closing member 85 which has an interior passageway or conduit 86 which is blocked off with a plug 87 formed from a low melting point alloy which will melt at the elevated temperatures which the gas spring 16 might be exposed to in a fire situation. When the plug 87 melts, the compressed gas in the second end chamber escapes through the conduit 86 and thereby relieves the pressure within the working chamber 67. This allows the incompressible liquid within the working chamber 67 to expand and prevents the loss thereof from the gas spring 16. The low melting point plug 87 provided in the conduit 86 generally may be formed from a low melting point alloy such as alloys of tin, lead, cadmium, zinc and mixtures thereof. Typical melting points range from about 80° to 350° C.

The compressed gas within the second end chamber 73 should be a non-combustible gas such as nitrogen, helium, argon, and neon or mixtures thereof. Pressures of the compressed gas may range from about 40 to 60 bars. Preferably, a fire retardant is incorporated into the compressed gas which sufficiently interferes with the combustion process to retard combustion in the area surrounding the seat upon the escape thereof from the gas spring. The preferred fire retardant is bromotrifluoromethane which is essentially non-toxic to humans even in concentrations as high as 10% by volume and are very effective in preventing combustion and flame propagation. These fire retardants are sold under the trademark Halon 1301 by the DuPont Company. Under the normal pressures of the compressed gas, the brominated, fluorinated hydrocarbons may exist at least in part in the liquid state. In the event of a fire, the plug 87 will melt, the compressed gas will escape the gas spring and envelope a passenger sitting in the seat. The fire retardant, because of the lowered pressure, will very rapidly vaporize, thus preventing combustion in this vicinity. However, the surrounding gas will not have any detrimental effects on the passenger. If desired, additional conduits can be provided in fluid communication with conduit 86 to direct gas escaping from the second end chamber 73 around a passenger sitting in the seat.

If the hydraulic fluid in the intermediate chamber 70 and first end chamber 71 is replaced by a fluid containing brominated, fluorinated hydrocarbons, a conduit, such as conduit 86 is provided between the intermediate chamber 70 or first end chamber 71 (or both) with a low melting point plug therein, such as plug 87, to exhaust the fire retardant gases when the temperature exceeds a predetermined maximum. If all or a substantial portion of the seating in an aircraft is provided with the gas spring in accordance with this invention, sufficient fire retardant can escape into the interior of the aircraft in the event of a fire to preclude further combustion.

While the invention has been described herein in connection with a passenger seat, it can be used in a wide variety of situations where the positional movement of one body with respect to another is controlled by an hydraulic cylinder. For example, the gas spring could be used in the overhead compartments in aircraft, trunk lids in automobiles, and many other uses. These and other modifications and improvements can be made without departing from the scope thereof.

What is claimed is:
1. An apparatus for adjusting and locking the position of one member with respect to another member comprising:
 (a) a gas spring assembly having an elongated housing one end of which is secured to one of said members and a piston rod extending out of the other end of the housing having a valve release rod thereon and being secured to the said other member;
 (b) a remote actuating assembly having a push button, a pivotally mounted two-arm crank, one of said arms operatively engaging a back side of the push button and the other arm receiving one end of an operating cable; and (c) a lever actuating assembly mounted to a support frame for one of said members including a mounting element, a lever arm pivotally mounted at one end thereof to the mounting element and having the other end of the operating cable removably secured to the free end of the lever arm, means on the lever arm to engage the valve release rod on the end of the piston rod, the mounting element having a first opening to receive the free end of the piston rod, a slotted receptacle adjacent and perpendicular to the first opening and adapted to receive a first spring clip, the first spring clip sliding through the receptacle to be mounted about a circumferential groove provided in the free end of the piston rod to thereby retain the free end of the piston rod in position so that movement of the operating cable caused by pressing on the push button of the remote actuator assembly will cause the lever arm to pivot and the means thereon to engage the valve release rod to open a valve and allow movement of hydraulic fluid between a first end chamber and an intermediate chamber.

2. The apparatus of claim 10 wherein the ends of the operating cable has provided thereon fittings which have a circumferential groove therein.

3. The apparatus of claim 11 wherein the remote actuating assembly is provided with a housing to leave an opening therein adapted to receive the fitting on one of the ends of the operating cable and a second spring clip engages the circumferential groove.

4. The apparatus of claim 12 wherein the mounting element of the lever actuating assembly is provided with an opening therein adapted to receive the fitting on the other end of the operating cable and a third spring clip engages the circumferential groove.

5. The apparatus of claim 1 wherein at least one of the ends of the operating cable is provided with a threaded collar adapted to urge against the surface on said mounting element opposite the side adjacent the spring clip engaging that end of the operating cable.

6. The apparatus of claim 1 wherein the operating cable comprises an outer covering and a cable element slidably positioned within the cable covering.

* * * * *

UNITED STATES PATENT AND TRADEMARK OFFICE
CERTIFICATE OF CORRECTION

PATENT NO. : 4,901,594

DATED : Feb. 20, 1990

INVENTOR(S) : Gunther Selzer

It is certified that error appears in the above-identified patent and that said Letters Patent is hereby corrected as shown below:

Column 3, line 28, cancel "along"

Column 8:

Claim 2, line 3, cancel "10" and insert --1--.
Claim 3, line 6, cancel "11" and insert --2--.
Claim 4, line 11, cancel "12" and insert --3--.

Signed and Sealed this

Tenth Day of December, 1991

Attest:

HARRY F. MANBECK, JR.

Attesting Officer     Commissioner of Patents and Trademarks